May 6, 1969  R. W. STOFFEL  3,442,467
INERTIA RETRACTING DEVICE WITH BALL LOCKING ELEMENTS
Filed July 31, 1967  Sheet 2 of 2

INVENTOR
ROBERT W. STOFFEL
BY
Hauke, Gifford & Gifford
ATTORNEYS

United States Patent Office 3,442,467
Patented May 6, 1969

3,442,467
INERTIA RETRACTING DEVICE WITH BALL
LOCKING ELEMENTS
Robert W. Stoffel, Ferndale, Mich., assignor to Jim
Robbins Seat Belt Company, Royal Oak, Mich.,
Filed July 31, 1967, Ser. No. 657,189
Int. Cl. B65h 75/48
U.S. Cl. 242—107.4          15 Claims

ABSTRACT OF THE DISCLOSURE

A rotary seat belt retractor having locking means responsive to the seat belt being unwound from the wind-up reel at a predetermined acceleration to lock the reel against rotation in the unwind direction, the reel normally being freely rotatable when the pull out forces acting on the belt produce an unwinding acceleration less than the predetermined acceleration. The locking means includes a cam wheel carried by the reel with peripheral notches registering with a fixed circular ratchet. A locking ball disposed in each notch is radially movable between a locked position where it is trapped between the outer end of the notch and the ratchet and a release position where it is seated at the inner end of the notch and separated from the ratchet. An inertia wheel rotatably mounted on the reel is coupled to the cam wheel and normally rotates in unison with the cam wheel. In response to an excessive unwinding acceleration of the reel, the inertia wheel rotates relative to the cam wheel and causes the displacement of the balls from their release to their locked position.

BACKGROUND OF THE INVENTION

Field of the invention

This invention relates to automatic locking safety seat belt retractors and more specifically to a retractor for a seat belt coupled to a body within a vehicle for the application of restraining forces which normally permits the belt to be freely extended and retracted from a wound up position so that the body can perform normal movements, but which responds to abnormal forces tending to suddenly displace the body from an initial position within the vehicle by locking the wind up reel against rotation with means for selectively varying the magnitude of the inertia necessary to trigger the locking means.

Description of the prior art

Automatic locking retractors for vehicle safety seat belts are normally constructed to permit the occupant of the vehicle to perform normal motions in a relatively unrestricted manner under normal driving conditions even through embraced by the seat belt assembly. The belt is freely extendible from a stored wound up position around a spring biased wind-up reel fixed to the vehicle. When the vehicle experiences sudden and violent changes in its momentum, of the type produced by a collision or a panic stop, the inertia of the occupant tends to displace him from his seated position in a direction corresponding to the former travel of the vehicle. This sudden displacement of the occupant produces a sudden accelerated extension of the belt from its wound up position. Automatic locking devices of this character normally employ locking means which are triggered by the accelerated extension of the belt as reflected in an increased wind-up reel rotation in the unwind direction to lock the reel against further rotation so that the occupant is restrained from moving into contact with injury-producing surfaces within the passenger compartment.

It is the broad purpose of the present invention to provide an improved inertia actuated locking device for seat belt retracting apparatus having a minimum number of components which can be economically assembled to form a reliable and adjustable mechanism.

SUMMARY

The preferred embodiment of the present invention, which will be subsequently described in greater detail, takes the form of a wind-up reel journaled for rotation on a base mounted adjacent the seat assembly of a vehicle. The seat belt is wound on the reel and has an extending end adapted for coupling to a body disposed in the seat assembly for the application of restraining forces. The lower end of the seat belt is attached to the reel so that rotation of the reel in a wind up direction rolls the belt into a wound up configuration and rotation of the reel in the opposite, unwind direction extends the belt from its stored wound up position. A spring biased member normally acting between the reel and the supporting base produces a yieldable force on the reel tending to bias the reel in the wind-up direction so that the slack in the extended portion of the belting is normally absorbed.

A ratchet member fixedly mounted on the base has a continuous series of abutments formed around the reel. A cam wheel carried by the reel has a series of peripheral notches which are rotatable adjacent the ratchet abutments. A locking ball is disposed in each of the notches and is normally seated at the inner end of the notch, spaced from the ratchet. When the balls are displaced toward the outer end of their respective notches, they become trapped between the outer end of their notch and the ratchet abutments so that the cam wheel is locked to the ratchet thereby preventing rotation of the reel in the unwind direction.

The disposition of each ball is determined by an inertia wheel which is rotatably mounted on the reel adjacent the cam wheel. The inertia wheel carries a pair of axially directed tabs registering in each of the notches of the cam member. When the inertia wheel rotates in one direction relative to the cam wheel, one of each pair of tabs displaces the ball to its release position, and when the inertia wheel rotates relative to the cam wheel in the opposite direction, the opposite tab displaces the ball to its locking position.

The cam wheel and the inertia wheel are yieldingly coupled together by a slot formed in the inertia wheel which receives a finger carried by the cam wheel. A drive spring disposed in the slot acts between the finger and the end of the slot so that the cam wheel drives the inertia wheel. The spring provides an adjustable force resisting relative movement between the two wheels so that they normally rotate in unison with the reel. When the pull out forces acting on the belt tend to rotate the reel at an abnormal rate, the inertia wheel, because of its mass tends to rotate relative to the cam wheel. When this inertia force overcomes the spring force acting between the inertia wheel and the cam wheel, the inertia wheel rotates relative to the cam wheel with the tabs displacing their respective ball elements toward their locked position to prevent the reel from further rotation in the unwind direction. When the forces producing the excessive pull out force on the belt have been relieved, the spring member returns the inertia wheel to its normal position relative to the cam wheel thereby returning the ball elements to their normal release position so that the reel can rotate in the unwind direction.

The magnitude of the tension with which the drive spring acts between the inertia and cam wheels is determined by a threaded member carried by the inertia wheel. Thus the magnitude of the inertia forces necessary to produce relative rotation between the two wheels can be adjusted by varying the tension of the spring and by means of a detent acting between the inertia wheel and the reel.

It is therefore an object of the present invention to provide a rotary seat belt retractor having an automatic reel locking means responsive to the sudden displacement of a body restrained by the seat belt and comprising a relatively few adjustable components.

It is another object of the present invention to provide an automatic locking rotary seat belt retractor which is responsive to the relative rotational movement between the wind-up reel and an inertia member to trigger a locking mechanism into locking the wind-up reel against rotation in the unwind direction.

Another object of the present invention is to provide an automatic locking retractor for a safety seat belt system which permits the occupant to perform normal movements in an unrestrained manner but is responsive to the relative rotation between the wind-up reel and an inertia member to trigger a locking mechanism in an emergency situation into locking the reel against rotation so that the belt applies a restraining force on the occupant, with means for selectively varying the magnitude of the inertia necessary to actuate the locking mechanism into its locked condition.

A still further object of the present invention is to provide an inertia operated automatic locking mechanism for a rotary seat belt retractor having a wind-up reel rotatably mounted on a base and including an annular ratchet member fixed to the base, a cam wheel mounted to the reel having a peripheral abutment, a displaceable ball element movable into a trapped position between the peripheral abutment of the cam wheel and the ratchet member to lock the reel against rotation, and an inertia wheel rotatably mounted on the reel and carrying a pair of axially extending tabs, the inertia wheel normally rotating in unison with the cam wheel but being relatively movable with respect to the cam wheel upon the application of forces producing an abnormally accelerated rotation of the reel so that the tabs displace the ball from a release to a locked position.

Still further objects and advantages of the present invention will become readily apparent to one skilled in the art to which the invention pertains upon reference to the following detailed description.

DESCRIPTION OF THE PREFERRED EMBODIMENTS

Figure 1:
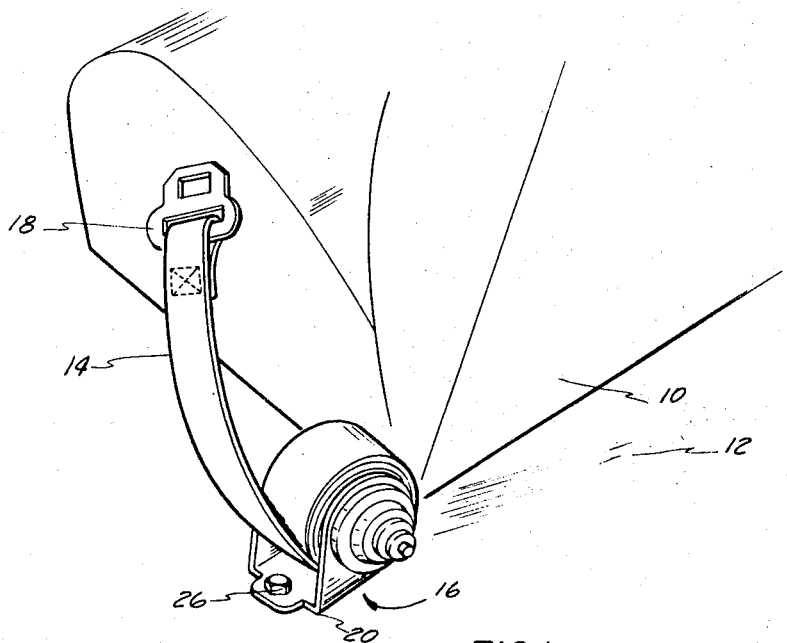
FIGURE 1 is a fragmentary perspective view of a vehicle seat assembly and a safety seat belt retracting device, illustrating the preferred embodiment of the invention, mounted adjacent thereto.

Now referring to the drawings, FIGURE 1 illustrates a vehicle seat assembly 10 mounted on the floor 12 of a vehicle. An elongated belt 14 is mounted on a retracting device generally indicated at 16 which is fixedly attached to the floor 12 adjacent the seat assembly 10 so that the belt 14 can be extended across the lap of a body disposed in the seat assembly 10. The extended end of the belt 14 carries a coupling section 18 which is normally buckled with a complementary coupling section (not shown) carried by a similar belt which extends from the opposite side of the seat assembly 10 to complete the restraining system.

In brief, the operation of the preferred retracting device 16 permits the occupant of the seat 10 to perform normal body movements while the belt 14 is coupled across his lap so that he can lean forward or sideways in the seat assembly with the belt 14 extending from the retracting device. When the occupant resumes his initial position, the retracting device winds the relaxed portion of the belt to absorb the slack. Thus the occupant of the seat has freedom of movement under normal driving conditions. However, if sudden violent forces acting on the vehicle tend to suddenly displace him forwardly, the preferred retracting device automatically operates to lock the belt 14 and prevent it from feeding the belt 14 from its stored position.

Figure 2:
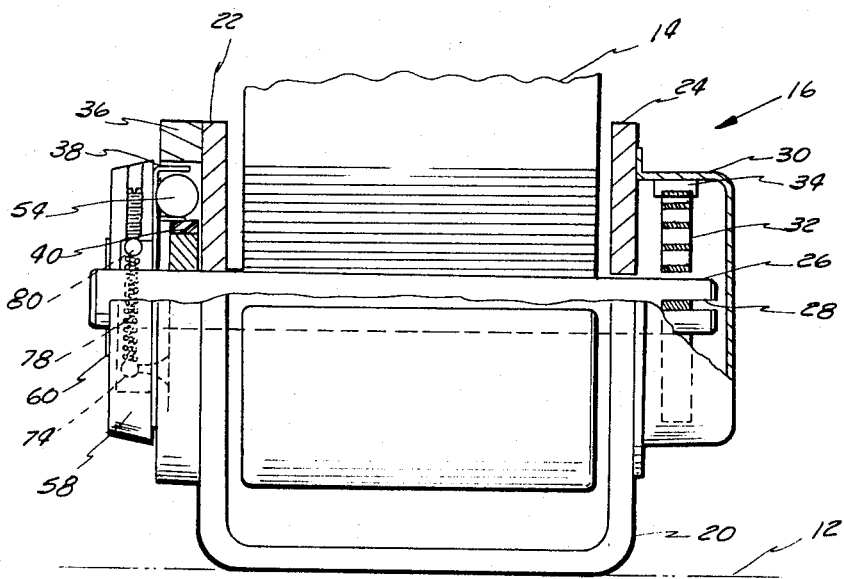
FIGURE 2 is a substantially longitudinal sectional view through the preferred automatic locking retracting device.
Figure 3:
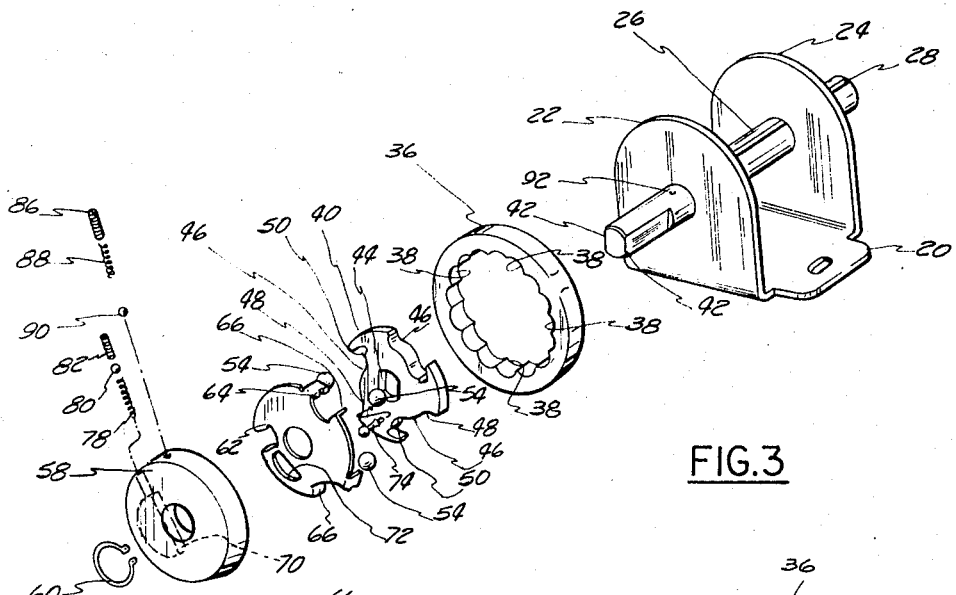
FIGURE 3 is an exploded view of the locking components of the preferred retracting device.

Now referring to FIGURES 2 and 3, the preferred retractor comprises a substantially U-shaped support means 20 having a pair of spaced, upright support flanges 22 and 24. The support means 20 is rigidly attached to the floor 12 by a pair of threaded fasteners 26, only one of which is illustrated.

A reel 26 is journalled for rotation in the flanges 22 and 24 and has a longitudinally extending slot 28 for receiving the terminal end of the belt 14. The belt 14 is attached to the reel by being threaded through the slot and stitched to itself so that when the belt 14 is fully extended, the reel 26 and the support means 20 provides a non-yielding connection between the belt 14 and the vehicle floor 12. The belt 14 could be attached to the reel 26 by other conventional means.

The slotted end of the reel 26 extends beyond the flange 24 and is enclosed by a substantially cup-shaped casing 30 which is fixed to the outer surface of the flange 24. A torsional spring 32 having its outer end attached to a slotted section 34 of the casing 30 and its inner and received by the slot 28 provides means for biasing the reel 26 in a wind-up direction. The spring 32 is normally pretensioned so that it at all times yieldingly biases the belt 14 towards a wound up stored condition, however, it permits the belt to be extended from its wound up position around the reel 26 when a nominal pulling force is applied on the belt.

A ring shaped ratchet member 36 fixed to the outer side-wall of the flange 22 has a series of abutments 38 formed around its inner edge. The abutments 38 are formed in a continuous series around the axis of rotation of the reel 26 and each has an arcuate cross-section formed in a plane transverse to the axis of rotation of the reel 26.

A cam wheel 40 is carried by the reel 26 within the ratchet member 36. The reel 26 has a pair of diametrically opposed flat sections 42 and the cam wheel 40 has a complementary bore 44 engaged with the flat sections 42 so that the cam wheel 40 is keyed to the reel 26 and rotates as a unit with the reel 26.

Three cam notches 46 are formed in the periphery of the cam whel 40 at circumferentially spaced intervals. Each of the cam notches 46 has a pair of substantially arcuate end sections 48 and 50. The outer end 48 of each of the notches rotates in close proximity to the arcuate abutments 38 of the ratchet member. The inner end 50 of each notch is radially spaced inwardly from the ratchet member.

A resilient insert 52 is mounted in the base of each of the notches 46 between the end sections 48 and 50. The inserts 52 have a rounded shape as best shown in FIGURES 4 and 5.

Figure 4:
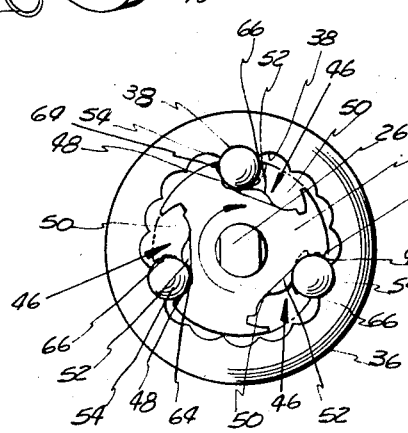
FIGURE 4 is a transverse sectional view through the locking mechanism of the preferred retracting device and illustrating the balls in their locked position.
Figure 5:
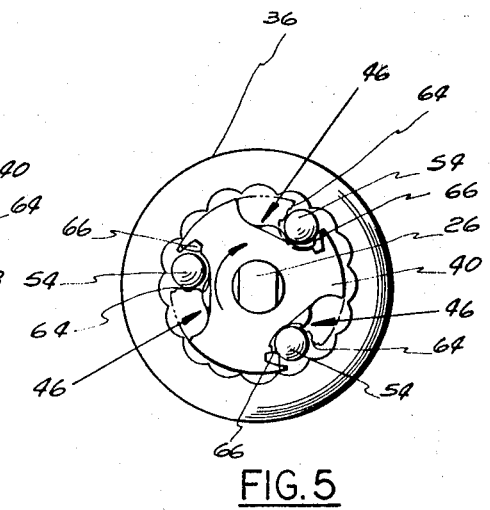
FIGURE 5 is a view similar to FIGURE 4, but showing the balls in their release position.

A metal ball 54 disposed in each of the notches 46 is displaceable between a release position adjacent the inner end section 50, best seen in FIGURE 5, and an alternate locked position wherein the ball 54 is disposed in the outer end section 48 and best seen in FIGURE 4.

The resilient inserts 52, which are preferably formed of a urethane, act as a yielding cam surface for guiding the movement of the balls 54 as they are displaced between alternate ends of the notches. The distance between the high point of each of the inserts 52 and the cusps of each of the ratchet abutments 38 is less than the diameter of the balls 54. Thus the inserts initially yieldingly oppose the displacement of the balls from the inner end of the notches to the outer end as they move from their release to their locked positions. The inserts are initially depressed by the balls and then snap the balls into their locked position where they are trapped between the outer end of their respective notches and the ratchet.

Assuming the reel is rotating in a clockwise wind-up direction, the balls 54 move in a counterclockwise direction relative to the cam wheel 40 when they are displaced to their locked position.

In the release position, the balls 54 are seated in the inner end 50 of the notches 46 so that they are substantially entirely contained within the profile of the cam wheel 40 thereby permitting the reel 26 to freely rotate relative to the ratchet 36 and the support means 20. It is to be understood that although three balls 54 and their associated notches are illustrated to lock the reel relative to the support 20, that one ball is sufficient to lock the reel against rotation, the other two balls providing a safety factor and a balanced locking action.

An inertia wheel 58 is mounted on the reel 26 outwardly of the cam wheel 40 and is rotatable relative to the reel 26. The inertia wheel 58 is retained against axial displacement with respect to the reel 26 preferably by a snap ring 60.

A plate member 62 is fixed to the inner face of the inertia member 58 and has a pair of tabs 64 and 66 extending into each of the notches 46. The ball between each pair of tabs is engaged by one of the tabs for displacement toward its release position, and engaged by the other tab for displacement toward its release position. This displacement is produced by the inertia wheel rotating relative to the cam wheel 40 and the reel 26.

Normally the inertia wheel 58 and the cam wheel 40 rotate in unison with the balls 54 in the release position as illustrated in FIGURE 5. When a sudden sharp jerk is produced on the belt 14 by the occupant being suddenly displaced from his seated position relative to the seat assembly 10, the reel 26 commences to rotate at an abnormally accelerated rate. The inertia wheel 58, because of its mass, develops a force acting on the wheel 58 in a direction opposite the rotation of the cam wheel. When this inertia force increases to a predetermined magnitude, the inertia wheel 58 rotates counterclockwise relative to the inertia whel 40 and the reel 26. As the inertia wheel 58 rotates relative to the cam wheel 40, the tabs 66 engage the balls 54 and displace the balls to their locked position wherein they are trapped between the outer end of the notches 46 and the ratchet abutments 38, thereby locking the reel 26 from further rotation in the unwind direction. When the forces acting on the belt 14 which produced the displacement of the balls 54 have been relieved, the inertia wheel 58 returns to its normal position relative to the cam wheel 40 and in so doing rotates in a clockwise direction relative to the cam wheel a distance sufficient to bring the tabs 64 into engagement with the balls 54 which are then displaced from their locked position to their release position. The reel 26 then can rotate in the wind-up and unwind directions so that the belt 14 can be extended and retracted.

Figure 6:
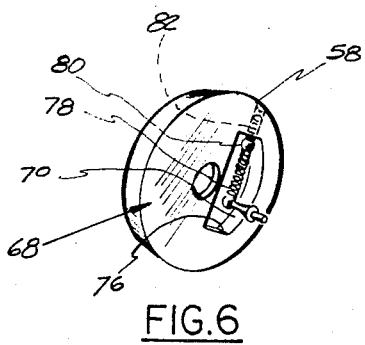
FIGURE 6 is a perspective fragmentary view of the inertia wheel illustrating the adjustable drive spring means.

The inertia wheel 58 is yieldingly coupled to the cam wheel 40 by a yieldable coupling means which is generally indicated at 68 in FIGURE 6. The coupling means 68 permits the magnitude of the inertia of the wheel 50 necessary to produce relative movement between the inertia wheel 58 and the locking wheel 40 to be adjusted to a predetermined level thereby providing means for adjusting the amount of abnormal accelerated movement of the belt 14 in the unwind direction which is necessary to trigger the locking means into locking the reel 26 against rotation.

The coupling means 68 comprises a slot 70 having an arcuate outer side formed in the inner surface of the inertia wheel 58 which registers with a similarly shaped aperture 72 formed in the plate 62. A finger 74 fixedly carried by the cam wheel 40 extends into the slot 70 and is normally adjacent the end 76 of the slot 70 when the inertia wheel 58 and the cam wheel 40 are rotating in unison. A drive spring member 78 disposed within the slot 70 has one end acting against the finger 74 and the opposite end acting against a ball 80. The position of the ball 80 and the tension acting on the spring 78 is determined by a set screw 82 which is threadably mounted on the inertia wheel 58.

Figure 7:
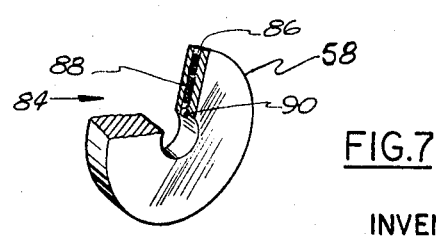
FIGURE 7 is a perspective fragmentary view of the inertia wheel illustrating the spring biased detent.

A detent means 84 acting between the inertia wheel 58 and the reel 26 controls the initial displacement of the inertia wheel 58 and the reel. Referring to FIGURES 3 and 7, detent means 84 comprises a set screw 86 threadedly mounted on the wheel 58 and acting against a spring 88 which biases a ball 90 into engagement with a depression 92 in the reel 26.

As viewed in FIGURE 6, assuming the rotation of the reel 26 is in the clockwise direction, the finger 74 drives the inertia wheel 58 through the spring 78. When the reel 26 is accelerated to a predetermined rotational rate, associated with an abnormal unwinding movement of the belt, the inertia wheel 58 rotates in the counterclockwise direction relative to the reel 26 because of the inertia associated with its mass. This relative rotation overcomes the predetermined bias of the spring 78 and the detent spring 88. Thus it can be seen that the point at which the inertia wheel 58 will rotate relative to the cam wheel 40 can be precisely adjusted by adjusting the set screws 82 and 86 which pretension the springs 78 and 88. It can also be seen that when the inertia wheel 58 has been displaced a distance sufficient to move the balls 54 to their locked position, that the bias of the spring 78 will return the inertia wheel 58 to its normal position with respect to the cam wheel when the abnormal forces acting on the belt have been relieved.

Thus it can be seen that I have described an extremely reliable inertia operated, automatic locking, retracting device for vehicle safety seat belts comprising a relatively few components and including means for adjusting the magnitude of the abnormal belt acceleration associated with the occupant being suddenly and violently displaced from an initial position within the vehicle which is necessary to trigger the locking means into locking the reel against rotation in the unwind direction.

I claim:
1. A vehicle restraining apparatus for controlling the displacement of a body relative to a vehicle, comprising:
   (a) a support means;
   (b) a reel rotatably mounted on said support means;
   (c) an elongated webbing having one end adapted for coupling to the body for the application of restraining forces and an opposite end attached to said reel;
   (d) resilient means for rotating said reel in a wind-up direction to wind said webbing about the reel, said resilient means being yieldable to a pull-out force on said webbing to rotate said reel in the opposite, unwind direction;

(e) ratchet means fixed to said support means including a locking abutment;

(f) a wheel member fixedly mounted on said reel and having a peripheral notch;

(g) a ball disposed in said notch and displaceable between a locked position in which said ball is trapped between said locking abutment and said notch to prevent rotation of said reel in the unwind direction and a normal, release position in which said ball is spaced from said locking abutment;

(h) an inertia member rotatably mounted on said reel and operable to rotate in unison with said wheel member when said reel is rotating in the unwind direction below a predetermined rotational acceleration, said inertia member being operable by inertia to rotate relative to said wheel member when said reel is rotating in the unwind direction at said predetermined rotational acceleration due to abnormal forces tending to displace the body relative to said vehicle;

(i) means responsive to relative rotation between said inertia member and said wheel member to displace said ball from said normal, release position to said locked position.

2. The restraining apparatus as defined in claim 1, wherein said ratchet means includes an annular series of abutments, each having a surface formed with an arcuate cross-section.

3. The restraining apparatus as defined in claim 2, wherein said peripheral notch rotates in a plane containing said series of abutmets, said notch having inner and outer end sections connected by an intermediate section, said ball being disposed in said notch displaceable between said inner and outer end sections in response to said inertia member rotating relative to said wheel member, and being trapped between said outer end section and one of said series of abutments to lock said reel against rotation in the unwind direction when said reel rotates in the unwind direction at said predetermined rotational acceleration.

4. The restraining apparatus as defined in claim 3, including resilient means disposed in the intermediate section of said notch and cooperating with said abutments to snap said ball into said locked position when said reel rotates at said predetermined rotational acceleration.

5. The restraining apparatus as defined in claim 1, including means for selectively varying the magnitude of the inertia effective to produce relative rotation between said inertia member and said wheel member.

6. The restraining apparatus as defined in claim 1 including yieldable means coupling said inertia member to said wheel member, comprising:

(a) said inertia member having a slot spaced from the axis of rotation of said inertia member;

(b) said wheel member having a fixedly mounted finger, the free end of said finger extending into said slot;

(c) spring means disposed in said slot in the plane of rotation of said finger and providing a driving connection between said wheel and said inertia member, the basis of said spring means yieldingly opposing relative movement between said wheel and said inertia member; and (d) means for adjusting the bias of said spring so that the magnitude of the inertia force necessary to produce relative rotation between said wheel member and said inertia member is selectively variable.

7. The restraining apparatus as defined in claim 6, including adjustable detent means acting between said inertia member and said reel and operable to control the magnitude of the inertia force necessary to initiate relative rotation betwen said wheel member and said inertia member.

8. The restraining apparatus as defined in claim 1, wherein said locking abutment has a contour complementary to said ball.

9. In a vehicle, restraining apparatus for controlling the displacement of a body relative to the vehicle, comprising:

(a) support means mounted on said vehicle;

(b) a reel rotatably mounted on said support means for rotation in wind and unwind directions;

(c) an elongated belt having one end anchored to said reel and an opposite end adapted for coupling with said body for the application of restraining forces, said belt being wound on said reel when said reel is rotated in said wind direction and being unwound from said reel when said reel is rotated in said unwind direction;

(d) resilient means normally biasing said reel in said wind direction to take up slack in said belt;

(e) a ratchet member fixed to said support means and having an annular series of ratchet abutments formed around the axis of rotation of said reel;

(f) a cam wheel mounted on said reel and rotatable in combination with said reel, said cam wheel having a cam notch formed along its peripheral edge with a locking abutment;

(g) a ball disposed in said cam notch and movable between a locked position wherein said ball is trapped between said locking abutment and one of said ratchet abutments to lock said reel against rotation in the unwind direction and a released position wherein said ball is disengaged from said ratchet abutment;

(h) an inertia wheel mounted on said reel adjacent said cam wheel;

(i) yieldable means coupling said inertia wheel and said cam wheel so that said inertia wheel rotates in unison with said cam wheel when said reel is rotating in the unwind direction below a predetermined acceleration, said inertia wheel being operable by inertia to rotate relative to said cam wheel when said belt, pulled by said body at an abnormal rate, produces rotation of said reel at said predetermined acceleration; and (j) tab means carried by said inertia wheel, said tab means being interengageable with said ball and operable to move said ball to said locked position from said released position in response to said inertia wheel rotating relative to said cam wheel.

10. The restraining apparatus as defined in claim 9, wherein said ratchet means comprises a closed series of indentations, each having an arcuate cross-section.

11. The restraining apparatus as defined in claim 10 wherein said cam notch has a pair of end sections connected by an intermediate section, one of said end sections rotating in close proximity to said ratchet means and the second of said end sections being radially spaced from said ratchet means, said ball being displaceable between said end sections in response to said inertia wheel rotating relative to said cam wheel.

12. The restraining apparatus as defined in claim 11, including resilient means fixed to the mid-section of said cam notch and cooperating with said ratchet means to snap said ball into said locked position when said reel rotates at said predetermined rotation acceleration.

13. The restraining apparatus as defined in claim 12, including means for selectively varying the magnitude of the inertia force necessary to produce relative movement between said inertia wheel and said cam wheel.

14. The restraining apparatus as defined in claim 13, including yieldable means coupling said inertia wheel to said cam wheel comprising:

(a) said inertia wheel having a slot formed in one face thereof, (b) said cam wheel having a fixedly mounted finger, the free end of said finger registering in said slot adjacent one end thereof, said finger being movable away from said one end of said slot when said inertia wheel rotates relative to said cam wheel;

(c) a threaded member mounted on said inertia wheel and movable toward and away from said one end of said slot; and (d) spring means disposed between said threaded member and said finger for urging said finger into abutment with said one end of said slot and opposing the movement of said finger away from said end with a predetermined force.

15. The restraining apparatus as defined in claim 14, including adjustable detent means acting between said inertia member and said reel and operable to control the magnitude of the inertia force necessary to initiate relative rotation between said cam wheel and said inertia wheel.

References Cited

UNITED STATES PATENTS

| | | | |
|---|---|---|---|
| 3,189,296 | 6/1965 | Wrighton et al. | 242—107.4 |
| 3,203,641 | 8/1965 | McFarlane et al. | 242—107.4 |
| 3,335,974 | 8/1967 | Glauser et al. | 242—107.4 |

WILLIAM S. BURDEN, *Primary Examiner.*